(12) United States Patent  
Hecht

(10) Patent No.: US 8,954,605 B1  
(45) Date of Patent: Feb. 10, 2015

(54) SYSTEM AND METHOD FOR PROVIDING CONTROLLED COMMUNICATIONS

(71) Applicant: Noson Hecht, Woodmere, NY (US)

(72) Inventor: Noson Hecht, Woodmere, NY (US)

( * ) Notice: Subject to any disclaimer, the term of this patent is extended or adjusted under 35 U.S.C. 154(b) by 0 days.

(21) Appl. No.: 14/246,844

(22) Filed: Apr. 7, 2014

(51) Int. Cl.
*G06F 15/16* (2006.01)
*H04L 12/58* (2006.01)

(52) U.S. Cl.
CPC ............................... *H04L 51/18* (2013.01)
USPC ............ 709/245; 709/206; 709/219; 709/229

(58) Field of Classification Search
None
See application file for complete search history.

(56) References Cited

U.S. PATENT DOCUMENTS

| | | | |
|---|---|---|---|
| 6,529,956 B1 * | 3/2003 | Smith et al. .................... | 709/229 |
| 7,149,893 B1 * | 12/2006 | Leonard et al. ................ | 713/154 |
| 7,424,543 B2 * | 9/2008 | Rice, III ......................... | 709/229 |
| 2003/0023695 A1 * | 1/2003 | Kobata et al. .................. | 709/206 |
| 2008/0127289 A1 * | 5/2008 | Julia et al. ..................... | 725/109 |
| 2008/0147679 A1 * | 6/2008 | Kelley et al. ................... | 707/10 |
| 2009/0248808 A1 * | 10/2009 | Izumi et al. .................... | 709/206 |
| 2011/0173547 A1 * | 7/2011 | Lewis et al. .................... | 715/752 |
| 2012/0203796 A1 * | 8/2012 | Abraham et al. .............. | 707/770 |
| 2013/0110890 A1 * | 5/2013 | Bailor ............................ | 707/827 |
| 2013/0124691 A1 * | 5/2013 | Suryavanshi ................. | 709/219 |
| 2013/0275765 A1 * | 10/2013 | Lay ................................ | 713/189 |
| 2014/0007258 A1 * | 1/2014 | Anderson et al. .............. | 726/28 |

* cited by examiner

*Primary Examiner* — Patrice Winder
(74) *Attorney, Agent, or Firm* — Pearl Cohen Zedek Latzer Baratz LLP

(57) ABSTRACT

A method of providing controlled communications receives communication data, at least one communication parameter and recipient information related to a transmission of the communication data to a recipient over the network. A link for accessing a viewer on a recipient's device is generated. The viewer is configured to receive packets of the communication data transmitted to the recipient device over the network, and display the packets of the communication data within the viewer. At least one control protocol relating to the transmission is activated. Once the viewer has been accessed by the recipient via the link, the packets of the communication data are transmitted to the viewer for display within the viewer while the transmission complies with the at least one communication parameter and while the at least one control protocol is adhered to. Systems can be constructed to implement the methods described herein.

20 Claims, 6 Drawing Sheets

(Continue to Fig. 2B, Step 218)

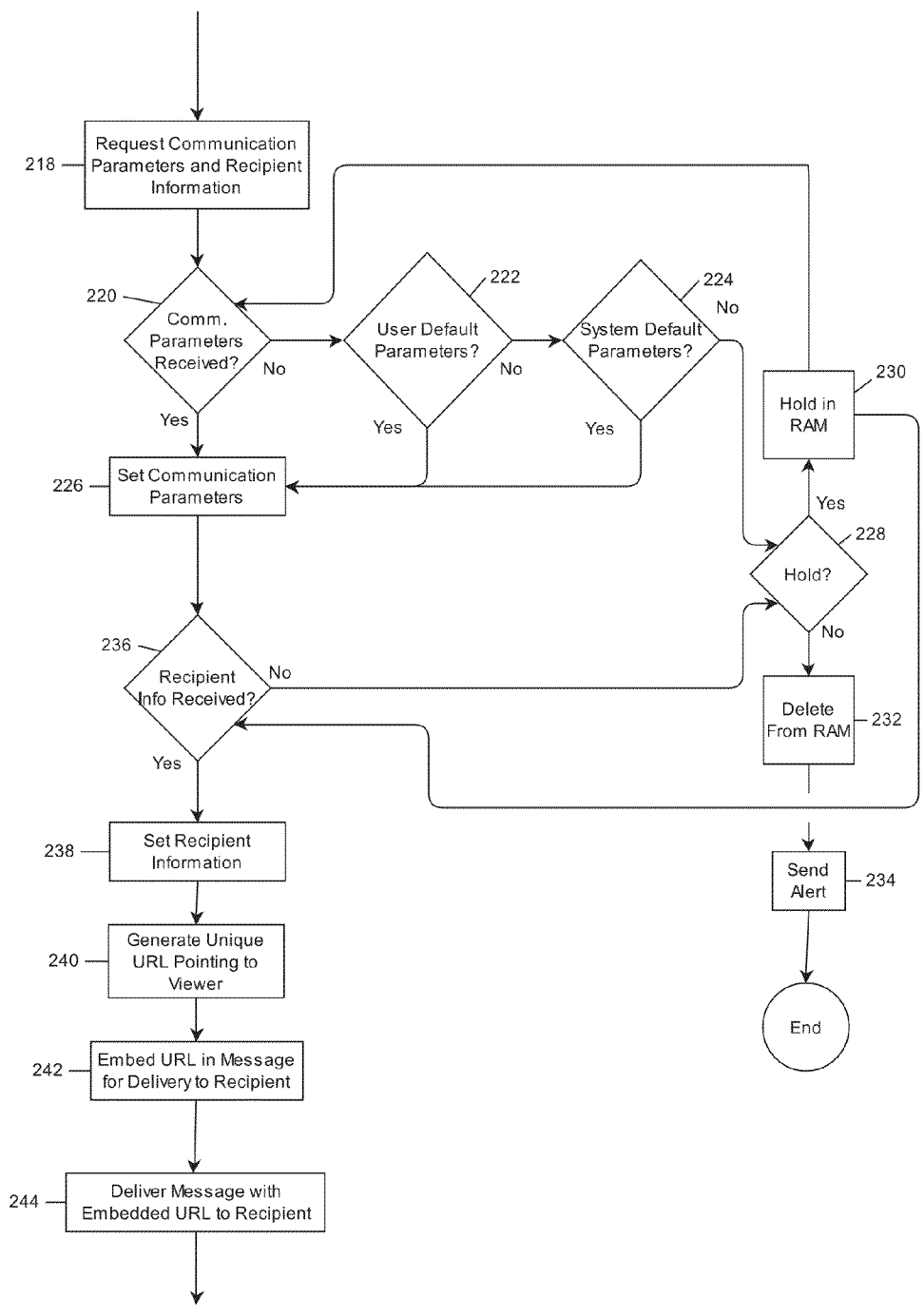

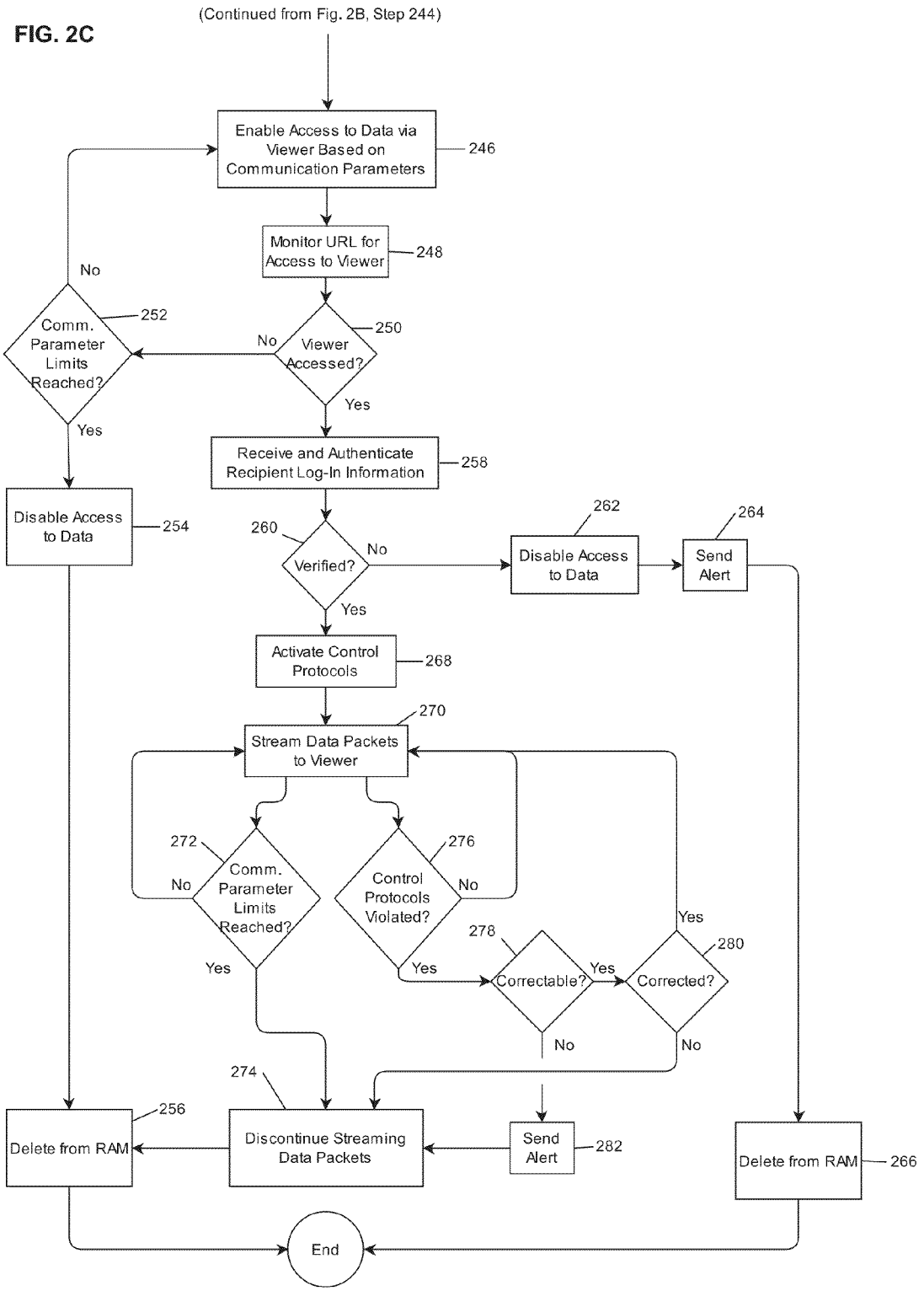

SYSTEM AND METHOD FOR PROVIDING CONTROLLED COMMUNICATIONS

TECHNICAL FIELD OF THE INVENTION

This patent application relates generally to the field of digital communication, and, in particular, systems and methods that provide support for improved control of the content of electronic communications.

BACKGROUND OF THE INVENTION

Technical advances and the increasing ubiquity of mobile phones, computers, tablets, and other electronic communication devices, have made electronic communication the primary method of communication in modern society. Businesses, governments, organizations, communities, schools, families, friends, acquaintances, and even adversaries, rely on such forms of electronic communication as e-mail, text messaging, and instant messaging as the backbone of any relationship or dialog. And with the growing popularity of social media and social messaging, other electronic communication platforms, such as "Twitter" and "WhatsApp," are adding hundreds of thousands of new accounts per day. An obvious benefit of electronic communication, when compared to old fashioned paper and pen, is that it is quick and easy to draft an electronic communication, designate a recipient, and hit send. The sender's message is nearly instantaneously delivered from the sender's device to the recipient's device, whether down the hall or across the globe.

However, it is that same ease and speed which also allows for electronic messages to be easily and quickly forwarded along to unintended recipients. In fact, the sender has almost no control over any electronic communication once it is sent. A sender cannot control for how long the electronic communication is available to the recipient, whether the recipient can save, download, printer or otherwise retain the electronic communication, or share it with a third party. The sender is therefore left to trust that the recipient will not do anything undesirable with the communication. This is particularly a problem when sensitive and/or private material is shared through any form of electronic communication.

Presently available systems and applications to date, which have focused on such techniques as "self-destructing" communications (i.e., embedded code which purportedly deletes an e-mail), do not adequately provide the level of control required for a sender to be truly confident that a received communication will only be viewed and used as the sender desires.

It is with respect to these and other considerations that the disclosure made herein is presented.

SUMMARY OF THE INVENTION

Technologies are presented herein in support of a system and method for providing controlled communications.

According to a first salient aspect of the invention, a method of providing controlled communications is disclosed. The method is performed by a server connected to a network and having a memory, a processor, and one or more code sets stored in the memory and executable in the processor. The method includes the steps of receiving, at the processor, communication data, receiving, at the processor, at least one communication parameter and recipient information related to a transmission of the communication data to a recipient over the network. In addition, the method includes generating, using code executing in the processor, a link for accessing a viewer on a recipient device, the viewer being configured to receive one or more packets of the communication data transmitted to the recipient device over the network, and display the one or more packets of the communication data within the viewer. The method also includes activating, using code executing in the processor, at least one control protocol relating to the transmission, determining, using code executing the processor, whether the viewer has been accessed by the recipient via the link, and, upon determining that the viewer has been accessed by the recipient, causing the transmission, using code executing in the processor, of the one or more packets of the communication data over the network to the viewer for display within the viewer while the transmission complies with the at least one communication parameter and while the at least one control protocol is adhered to.

Methods in accordance with more particular aspects of the invention can include further steps. For instance, the method can include embedding the link in a digital communication and providing the digital communication to the recipient over the network; requesting a verification of the recipient and transmitting the one or more packets of the communication data to the viewer only upon receiving the verification; and monitoring at least one input device of the computing device for one or more predefined violating inputs deemed to violate the at least one control protocol and automatically discontinuing the transmission of the one or more packets of the communication data to the viewer upon detecting the one or more predefined violating inputs, wherein the one or more predefined violating inputs comprises at least one of a selection of, or pointing to, any area of the display other than within the viewer, and a pressing of at least one button or key of the input device that is deemed to violate the at least one control protocol.

Likewise, the method can further include activating a write-only function of the viewer and automatically discontinuing the transmission of the one or more packets of the communication data to the viewer upon detecting an attempted read function of the viewer; and monitoring the transmission to ensure that the one or more packets of the communication data is received by the viewer, and automatically discontinuing the transmission of the one or more packets of the communication data to the viewer upon detecting that the one or more packets of the communication data was not received during the transmission.

Furthermore, in accordance with additional aspects of the method, the at least one communication parameter can comprise at least one of a period of time during which the communication data can be displayed in the viewer, a number of times the viewer can be accessed, and an indication relating to with whom the communication data can be shared electronically. The method can further include deleting the received communication data when the transmission no longer complies with the at least one communication parameter; and deleting the received communication data when the at least one control protocol has been violated and the violation cannot be corrected. The method can also include establishing a secure tunnel between the server and the recipient device, and causing the transmission of the one or more packets of the communication data over the network to the viewer through the secure tunnel.

According to a second salient aspect of the invention, a system on which the methods described can be implemented is also disclosed. These and other aspects, features and advantages will be understood with reference to the following description of certain embodiments of the invention.

BRIEF DESCRIPTION OF THE DRAWINGS

FIGS. 2A-C show a detailed flow diagram illustrating elements of a method for providing controlled communications according to at least one embodiment of the invention;

DETAILED DESCRIPTION OF CERTAIN EMBODIMENTS OF THE INVENTION

Figure 1:
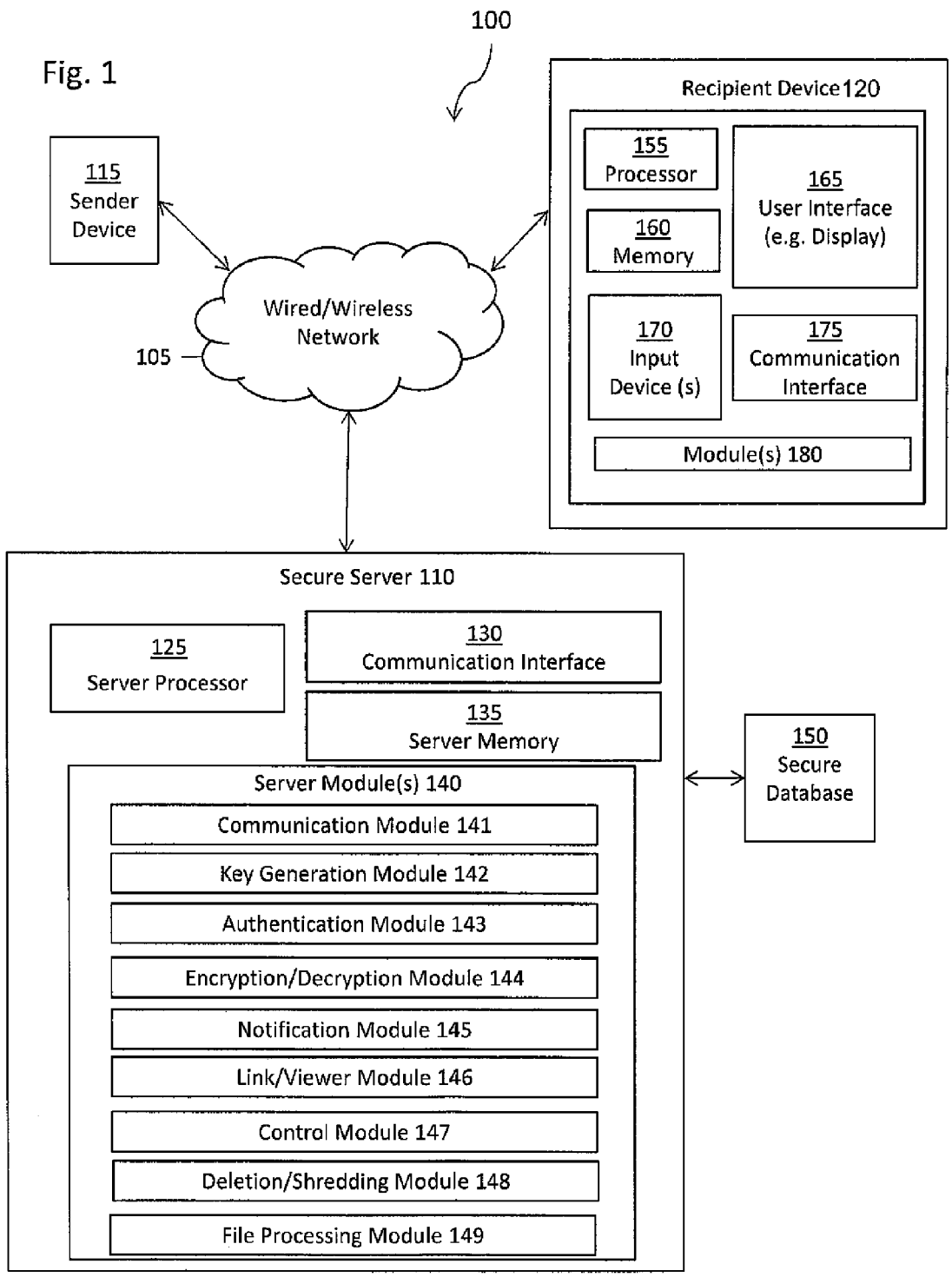
FIG. 1 is a high-level diagram illustrating an exemplary configuration of a system for providing controlled communications according to at least one embodiment of the invention.

By way of overview and introduction, various systems and methods are described herein that facilitate controlling information shared in an electronic communication. As described herein, the systems and methods allow a sender to define communication parameters (e.g., how long an electronic communication is available for viewing by a recipient), and provide control protocols to actively restrict and prevent against unauthorized viewing and manipulation of an electronic communication (e.g., preventing against a screen capture). In addition, the system implements encryption protocols to further protect against unauthorized access to the controlled communication, both in storage and in transit.

This is accomplished in accordance with several aspects of embodiments of the invention by incorporating existing security mechanisms, such as Secure Sockets Layer (SSL) technology, digital signatures, and symmetric and asymmetric (public/private) key cryptography, with proprietary security measures, to create layers of control which protect an electronic communication. A sender generates or selects an electronic communication (e.g., a document, e-mail, text message, audio message, video, or image, etc.) and uploads the electronic communication to a secure server via an SSL tunnel, at which point the electronic communication can be encrypted while in server memory. (The electronic communication can be encrypted on the sender's device as well, in addition to or in place of being encrypted at the secure server.) The sender can define one or more communication parameters, as well as designate a recipient of the electronic communication. The secure server generates a unique uniform resource locator (URL or "link") which can be provided to the computing device of the recipient. The URL can be used to access a secure viewer to which the electronic communication can be transmitted and on which it can be viewed. Once the viewer is accessed, and the recipient is verified through an authentication process, the secure server transmits packets of the electronic communication over a network via a secure connection to the secure viewer, where it is displayed to the recipient. The secure server is configured to implement a number of control protocols which actively prevent a recipient from performing any unauthorized events, such as saving, copying, printing or otherwise capturing and/or manipulating the electronic communication without the sender's consent while the secure viewer is displaying the electronic communication.

The secure server is also configured to monitor the transmission and the secure viewer for any indication that the recipient is attempting to take any action other than view the electronic communication, i.e., that no control protocol has been violated. As explained in detail below, monitored actions can include, for example, monitoring inputs of various input devices of the recipient's computing device, such as keystrokes on a keyboard, movement (i.e., change of coordinates) of a pointer/cursor on a display, touch sensors on a touchscreen, etc., any of which can indicate that the recipient is attempting to print, save, download, copy, or otherwise capture and/or manipulate the content of the electronic communication. In accordance with embodiments of the invention, depending on the electronic device being used to view the communication, the secure server can be configured to implement the appropriate control protocols.

Once accessed by the recipient, the viewer can display the electronic communication provided the transmission complies with the communication parameters and no control protocols have been violated. If a control protocol is violated, transmission will temporarily pause, and the secure server is configured to determine whether the violation is correctable. If it is not correctable, transmission will cease entirely, and if it is correctable, the system will only continue transmission once corrected. Likewise, once the limits of the communication parameters have been reached, transmission will cease. In either case, once transmission ceases, the electronic communication is erased from the secure server.

Turning now to FIG. 1, the schematic block diagram illustrates a distributed network system 100 including network 105, which can comprise the Internet, one or more telephony networks, one or more network segments including local area networks (LAN) and wide area networks (WAN), one or more wireless networks, or a combination thereof. System 100 also includes a secure server 110 constructed in accordance with one or more implementations of the invention. The secure server 110 communicates over network 105 with multiple other processing machines such as computers, and more specifically stationary devices, mobile devices, and computer servers (collectively, "computing devices"). Communication with these computing devices can be either direct or indirect through further machines that are accessible to the network 105.

The secure server 110 can be practically any computing device and/or data processing apparatus capable of communicating with computing devices, and other remote devices or computing networks, receiving, transmitting and storing electronic information and processing requests as further described herein. Secure server 110 is therefore intended to represent various forms of digital computers, such as laptops, desktops, workstations, personal digital assistants, servers, blade servers, mainframes, and other appropriate computers and/or networked or cloud based computing systems capable of employing the systems and methods described herein.

Among the computing devices on the network 105 are user devices which can include sender device 115 and recipient device 120. As understood herein, in accordance with one or more embodiments, a computing device can be a stationary computing device, such as a desktop computer, kiosk and/or other machine, each of which generally has one or more processors configured to execute code to implement a variety of functions, a computer-readable memory, one or more input devices, one or more output devices, and a communication port for connecting to the network 105. Typical input devices can include a keyboard, pointing device (e.g., mouse or digitized stylus), a web-camera, and/or a touch-sensitive display, etc.

Additionally or alternatively, a computing device can be a mobile electronic device ("MED"), which is generally understood in the art as having hardware components as in the stationary device described above, and being capable of embodying the systems and/or methods described herein, but which may further include componentry such as wireless communications circuitry, gyroscopes, inertia detection circuits, geolocation circuitry, touch sensitivity, among other sensors. Non-limiting examples of typical MEDs are smartphones, personal digital assistants, tablet computers, and the like, which can communicate over cellular and/or Wi-Fi networks or using a Bluetooth or other communication protocol. Typical input devices associated with conventional MEDs include, keyboards, microphones, accelerometers, touch screens, light meters, digital cameras, and the input jacks that enable attachment of further devices, etc.

The secure server 110 can include a server processor 125 which is operatively connected to various hardware and software components that serve to enable operation of the system 100. Server processor 125 serves to execute instructions to perform various operations relating to security and transmission processing as will be described in greater detail below. Server processor 125 can be a number of processors, a central processing unit CPU, a graphics processing unit GPU, a multi-processor core, or any other type of processor, depending on the particular implementation. Secure server 110 can be configured to communicate via communication interface 130 with various other devices connected to network 105. Preferably, communication interface 130 can include but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting the secure server 110 to other computing devices and/or communication networks such as private networks and the Internet.

In certain implementations, a server memory 135 is accessible by server processor 125, thereby enabling server processor 125 to receive and execute instructions such a code, stored in the memory and/or storage in the form of one or more software modules 140, each module representing one or more code sets. The software modules 140 can comprise one or more software programs or applications (collectively referred to as the "server application") having computer program code or a set of instructions executed in the processor 125 for carrying out operations for aspects of the systems and methods disclosed herein, and can be written in any combination of one or more programming languages. As shown in FIG. 1, the exemplary software modules can include a communication module 141, a key generation module 142, an authentication module 143, an encryption/decryption module 144, a notification module 145, a link/viewer module 146, a control module 147, a deletion/shredding module 148, and a file processing module 149. It should be noted that in accordance with various embodiments of the invention, server modules 140 can execute entirely on secure server 110 as a stand-alone software package, partly on secure server 110 and partly on the computing devices 115 and/or 120, or entirely on devices 115 and/or 120.

Server memory 135 can be, for example, a random access memory (RAM) or any other suitable volatile or non-volatile computer readable storage medium. Server memory 130 can also include storage which can take various forms, depending on the particular implementation. For example, the storage can contain one or more components or devices such as a hard drive, a flash memory, a rewritable optical disk, a rewritable magnetic tape, or some combination of the above. In addition, the memory and/or storage can be fixed or removable. In addition, memory and/or storage can be local to the secure server 110 or located remotely.

In accordance with further embodiments of the invention, secure server 110 can be connected to secure database 150. Secure database 150 can comprise any of the memory configurations as described above, and is in direct communication with secure server 110. However, secure database 150 can be segregated for security purposes, as will be explained below.

As shown in FIG. 1, a typical computing device, for example recipient device 120, includes various hardware and software components that serve to enable operation of the system 100, including one or more device processors 155, a device memory 160, a user interface 165, one or more input devices 170, a communication interface 175, and one or more software modules 180. As with server processor 125, device processor 155 can be a number of processors, a central processing unit CPU, a graphics processing unit GPU, a multi-processor core, or any other type of processor, depending on the particular implementation. Likewise, device memory 160 is accessible by device processor 155, thereby enabling the processor to receive and execute instructions encoded in the memory so as to cause the computing device and its various hardware components to carry out operations for aspects of the exemplary systems and methods disclosed herein. Device memory 130 can comprise one or more of the memory configurations as described above with reference to server memory 135.

A user interface 165 is also operatively connected to device processor 155. User interface 165 can comprise a display and/or graphical inputs displayed thereon, which can serve to facilitate both the providing of information to a user and as an input device, depending on the particular hardware and software. Also connected to the device processor 155 is one or more input and/or output device(s) 170, such as switch(es), button(s), key(s), a touch-screen, microphone, etc., as would be understood in the art of electronic computing devices. Input devices 170, which can be used in conjunction with user interface 165 or on their own, serve to capture commands and/or actions from the user such as on-off commands, user-provided information, settings adjustments, and/or any relevant user interaction with the computing device related to operation of the system 100.

Communication interface 175 is also operatively connected to the device processor 155 and can be any interface that enables communication between the computing device and external devices, machines and/or elements. As with the server communication interface 130, the device communication interface 175 can include but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting the computing device to communication interface 130 of secure server 110 and/or other computing devices and/or communication networks such as private networks and the Internet. Such connections can include a wired connection or a wireless connection (e.g., using the 802.11 standard), though the communication interface can be practically any interface that enables communication to/from the computing device.

The one or more device modules 180 are encoded in the memory 160 of the computing device. The software modules can comprise one or more software programs or applications having computer program code or a set of instructions (collectively referred to as the "client application") executed in device processor 155. Such computer program code or instructions configure device processor 155 to carry out operations of the systems and methods disclosed herein and can be written in any combination of one or more programming languages. It should be noted that in accordance with embodiments of the invention, device modules 180 can execute entirely on computing devices 115 and/or 120 as a stand-alone software package, partly on the computing device and partly on secure server 110, or entirely on secure server 110.

It should also be noted that while in FIG. 1, the two computing devices 115 and 120 are designated as a "sender device" and a "recipient device" respectively, the computing devices do not necessarily have to belong to the sender and/or the recipient; rather, these designations simply indicate the respective user's ability to access and use the computing device in accordance with embodiments of the invention.

Figure 2A:
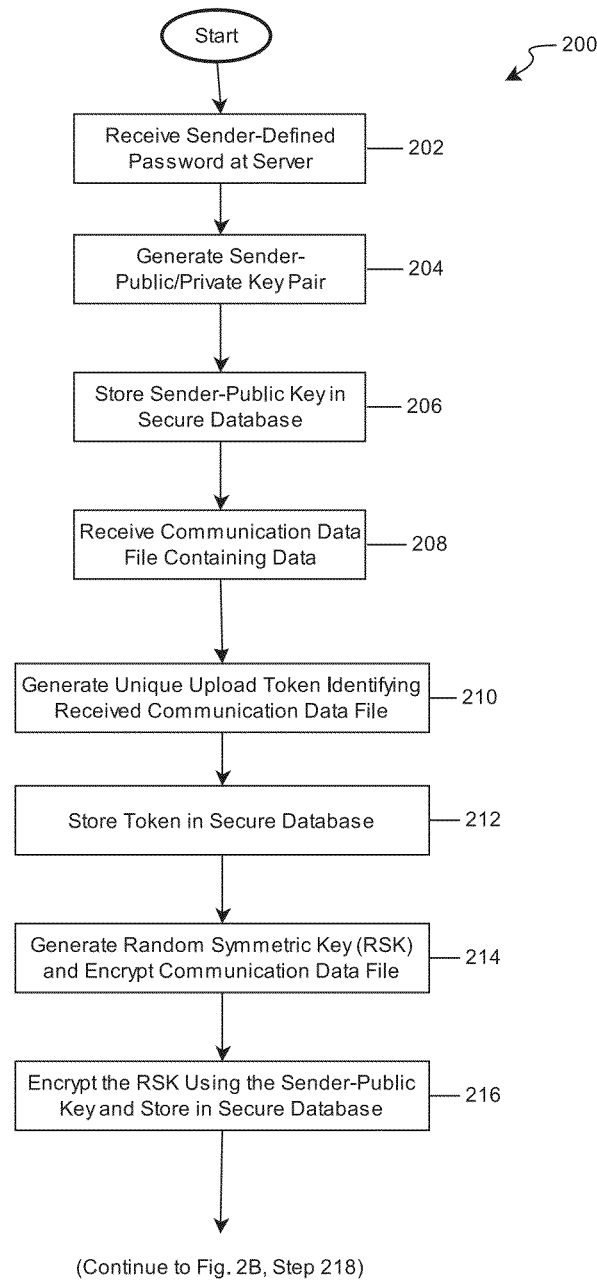

Turning to FIGS. 2A-C, a detailed flow diagram illustrating elements of a method for providing controlled communications according to embodiments of the invention is provided. Method 200 starts at step 202 when secure server 110, using server processor 125, which is configured by executing one or more software modules 140, including, preferably, communication module 141, receives log-in information from the sender device 115, including at least a sender-defined password of a sender. Typically, an e-mail address or other user identification can be received in addition to the sender-defined password in order to facilitate identifying the sender, though this is may not be required, for example, when an Internet Protocol (IP) address of the sender's computing device 115 readily identifies the sender. Alternatively the sender-defined password or the sender's IP address can be the only means of authentication, providing a certain degree of anonymity.

In some embodiments, the receipt of the log-in information can be in response to a request for such information, such as via a dialog box or other command prompt, etc., displayed on sender device 115. In conventional manner, such a request can be displayed on a web page of a web browser of sender device 115, such as when the sender "navigates" to a web page associated with secure server 110, or can be generated or displayed by an application or application programming interface (API) resident on sender device 115 which is configured to communicate with secure server 110.

In accordance with embodiments of the invention, the sender-defined password can be any alpha-numeric string, but optimally comprises a word, phrase, or character string that can be recalled by the sender during future interactions with system 100. The sender-defined password is entered by the sender using one or more inputs of sender device 115, and received at secure server 110. Once received, at step 204, server processor 125, executing key generation module 142, is configured to derive an asymmetric cryptographic public/private key pair using a key derivation function (KDF). A KDF derives one or more secret keys from a secret value such as a master key or other known information such as a password or passphrase using a pseudo-random function. The key pair is therefore uniquely associated with the sender by virtue of being derived from the sender's password.

Briefly, asymmetric key cryptography refers to a cryptographic algorithm which requires two separate keys, one of which is secret (or private) and one of which is public. Although different, the two parts of this key pair are mathematically linked. The public key is used to encrypt a message or data (referred to as plaintext or cleartext) or to verify a digital signature; whereas the private key is used to decrypt the encrypted data (referred to as ciphertext) or to create a digital signature. The term "asymmetric" stems from the use of different keys to perform these opposite functions, each the inverse of the other—as contrasted with conventional ("symmetric") cryptography which relies on the same key to perform both the encryption and decryption. The strength of asymmetric cryptography lies in the fact that it is "impossible" (computationally infeasible) for a properly generated private key to be determined from its corresponding public key. Thus the public key may be published or otherwise left unprotected without compromising security, whereas the private key must not be revealed to anyone not authorized to decrypt the data or perform digital signatures.

Typically, user-defined passwords tend to be chosen from within the relatively small and non-uniform lexicon of alpha-numeric strings that can be recalled by an average user. Therefore, passwords are vulnerable to exhaustive search, which, for passwords, is traditionally named "dictionary attack." Embodiments of the invention, therefore, can incorporate one or more generic mechanisms to cope with this problem. A first embodiment uses a configurable slow key derivation function. This makes dictionary attacks proportionally slower, but also makes normal usage slower, by the same factor. A second embodiment uses what is known as a "salt," which prevents attack parallelism. Parallelism relates to attacking N passwords (not necessarily simultaneously) for less than N times the cost of attacking one password. The salt is a piece of data which acts as a variation to the KDF.

In accordance with embodiments of the invention, server processor 125 is configured by executing key generation module 142 to derive the sender-defined password into a sender-secret key using the KDF. In accordance with various embodiments of the invention, the sender-secret key can be generated using any of a variety of asymmetric cryptographic algorithms as known in the relevant art, such as Elliptic Curve algorithms, to create, for example, a 256 bit or 512 bit key. The sender-secret key is then used as a seed for a "Pseudorandom Number Generator" (PRNG). The PRNG is deterministic, which means the same seed implies the same output sequence, and the PRNG produces random bits. The PRNG is used in conjunction with a key pair generation algorithm to generate the sender public/private key pair. Since this procedure is deterministic (for a given source password), server processor 125 can be configured to re-generate the same result again every time the sender's private key is required. Furthermore, in embodiments when a salt is included, the salt can be the sender's username, user identification, or email address, etc., which is unique within the system, and thus even multiple senders with the same password will not derive the same PRNG and subsequently will not derive the same key pair. Then, at step 206, a copy of the sender's public key is stored in the secure database 150 for later use, as explained below.

It should be noted that by incorporated the methods described herein, secure server 110 can also be configured to quickly and efficiently create user accounts for any user (e.g., a sender or recipient) who provides log-in information to the server, even if the user has not previously created an account. If the log-in information received includes an e-mail address or other user identification (e.g., a Facebook user name) and a corresponding password, the e-mail address or user identification can be verified by the system 100, thus authenticating the provider of the log-in information (in this case, the sender, but also possibly a recipient as described below). Once verified, a user account can be generated for that user. The sender can also be prompted to approve integration of any personal details and/or contact information available into the generated user account. Such personal details and/or contact information can be used for further processes/steps as required, for example, to enable a sender to quickly select one or more recipients to whom the communication data file will be transmitted, as described below.

At step 208, secure server 110, using server processor 125, which is configured by executing one or more software modules 140, including, preferably, communication module 141, receives from sender device 115 a communication data file containing data to be transmitted to recipient device 120. As explained above, in accordance with various embodiments of the invention, the data can represent text, a document, an image, a video recording, an audio recording, etc., and is provided from sender device 115 to server memory 135 of secure server 110 via a secure tunnel, such as an SSL tunnel. SSL is a standard security protocol that establishes an encrypted connection between a server (such as secure server 110) and a browser of a client device (such as sender device 115), and allows sensitive information to be transmitted between the two. Examples of common SSL protocols include HTTPS, WWS, and RTMPS.

Briefly, an SSL tunnel is typically created when a client device requests a secure connection with a server. The process which establishes the SSL tunnel between the two devices is called an "SSL Handshake." The server provides the client with an SSL Certificate issued by a Certificate Authority (CA), which includes the server's public key, and which verifies the identity of the server. In conventional manner, the client device checks the certificate root against a list of trusted Certificate Authorities, and confirms that the CA-issued SSL Certificate is valid. Once the CA-issued SSL Certificate is validated, the client device creates, encrypts, and sends back to the server a symmetric session key using the server's public key. The server decrypts the symmetric session key using the server's private key and sends back to the client device an acknowledgment encrypted with the symmetric session key to start the encrypted session. All data passed between the two devices via the SSL tunnel are encrypted using the symmetric session key. Of course, those of ordinary skill in the art will understand that other types of secure tunnels and/or protocols can be used as well, such as a secure shell (SSH) tunnel, which consists of an encrypted tunnel created through an SSH protocol connection.

It should be noted that additional and/or redundant security measures are also feasible. For example, while in the embodiment described above the communication data file received from sender device 115 is encrypted and decrypted by the SSL protocol while in transit, in some embodiments, the communication data file can be first encrypted with an initial encryption layer by encryption software executed on the sender device 115, and then transmitted via SSL (which itself encrypts the now-encrypted communication data file with a second layer of encryption). More specifically, computer networks can use a tunneling protocol in which one network protocol (the delivery protocol) encapsulates a different payload protocol. By using tunneling, a secure path through an untrusted network can be provided. A secure tunnel typically encapsulates packets of plaintext data inside other packets, which are encrypted and decrypted using the symmetric key and other security protocols agreed upon by the server and client device during a handshake. However, the plaintext can itself be encrypted prior to being transmitted through the tunnel (either by the sender or by the server), and then decrypted, for example, on the recipient's device, once it exits the tunnel. Such an additional measure would effectively ensure that even if the transmission were somehow intercepted as it entered/exited the SSL tunnel, and/or the SSL encryption were broken, the communication data file would still be protected with the initial layer of encryption. Once received at the secure server 110 via the SSL tunnel, the initial encryption layer can be decrypted, and the method continues. It will be readily understood by those of ordinary skill in the art that this is simply an example, and that such redundancies can be implemented at any stage of the methods described herein, such as, for example, when the communication data file is transmitted to recipient device 120 from secure server 110, as described in detail below.

At step 210, server processor 125 executes instructions such as code from server memory 135 that communicates with server processor 125 represented by authentication module 143, to generate a unique upload token identifying the received communication data file. In accordance with embodiments of the invention, the token can be generated by the server processor 125 when a timestamp, the sender's e-mail address, and/or any other metadata is appended to the cleartext (message data) of the communication data file. The server processor 125 is configured to execute the authentication module 143 to cause secure server 110 to hash the combined message data and metadata using a cryptographic hash function, and encrypt the hash with a server-public key of the secure server 110 to generate the unique token. At step 212, secure server 110 is configured to then save the token in secure database 150 in association with the sender-public key, while the communication data file remains in the server memory 135.

Briefly, a cryptographic hash function (known as "hashing") takes an input message in digital form, scrambles the message, and condenses it to a shorter "digest" such that even a minor change in the original message will result in a vastly different digest that is output, compared with the output of the unchanged original message. Hashing functions are easy to compute in one direction and difficult to find the inverse. There are a number of standard hash functions commonly used, such as, for example, MD5, MD4, SHA-256, and SHA-1. It is the digest outputted by hashing the combined message data and metadata which is used as the unique token. Because altering the token would be detectable, the token can be used to authenticate the sender as the original uploader of the communication data file, if necessary.

In accordance with some embodiments, though not required, at this point the hash can also be digitally signed by secure server 110 and/or sender device 115, for ownership proof purposes. A digital signature is a mathematical scheme for demonstrating the authenticity of a digital message or document. A number of different digital signature algorithms have been developed and are commonly used in practice, such as the Digital Signature Algorithm (DSA), the Elliptic Curve Digital Signature Algorithm (ECDSA), and the Schnorr signature algorithm, for example. A valid digital signature gives a recipient reason to believe that the message was created by a known sender, such that the recipient can be assured the sender sent the message (authentication and non-repudiation) and that the message was not altered in transit (integrity). Digital signatures are commonly used for software distribution, financial transactions, and in other cases where it is important to detect forgery or tampering. These concepts can be incorporated into the system to authenticate the original creator of the communication data file, if desired.

It should be noted that while the method as described heretofore includes various steps which identify the sender, in alternative/additional embodiments server processor 125 can execute computer memory code represented by authentication module 143, to generate a unique upload token identifying the received communication data file even prior to secure server 110 identifying the sender. In such alternative/additional embodiments, the received communication data file can simply be held in server memory 135 for a predefined period of time until all relevant information is provided or the communication data file is deleted.

It should also be noted that key transport between the secure server 110 and secure database 150 can also be encrypted using Transport Layer Encryption (SSL/TLS) or by wrapping the key transport in symmetric/asymmetric encryption. This would allow for a total segregation of secure server 110 and secure database 150. Furthermore, other security measures can be implemented to further secure the system 100. These measures can include, for example: not allowing key formation to exist in swap space; not placing key information in a heap data structure—using local variables as opposed to dynamically allocating memory; no allowing a core dump on the secure server 110; freeing memory after use and setting pointers to null; and routinely backing up the secure database 150.

At step 214, server processor 125 executes instructions such as code from server memory 135 that communicates with server processor 125 represented by key generation module 142 and encryption/decryption module 144 to generate a random symmetric key (RSK) and encrypt the communication data file using the RSK. In accordance with various embodiments of the invention, the RSK can be generated using an Advanced Encryption Standard, such as AES-256-cbc, AES-256-ebc, or AES-512, etc. Furthermore, secure server 110 can be configured to generate a new RSK for each communication data file that is uploaded to the server. As explained above, a symmetric key is used to both encrypt and decrypt data.

Then, at step 216, server processor 125 executes instructions such as code from server memory 135 that communicates with secure processor 125 represented by encryption/decryption module 144 to encrypt the RSK itself using the sender-public key (previously saved in secure database 150) and save the encrypted RSK in the secure database 150. This provides the sender with the sole means to decrypt and access the RSK using the corresponding sender-private key, and thus the sole means to decrypt the communication data file. When required, the sender-private key can either be called from the sender device 115 if it has been previously stored in the device memory, or can be generated on-the-fly using the sender-defined password as explained above. As will be explained in detail below, once recipient information is received by secure server 110, the encrypted RSK can be decrypted using the sender-private key and then, for example, re-encrypted using a public key of the recipient (e.g., a public key generated by the recipient device 120), thus enabling the recipient to securely access the communication data file.

It will of course be obvious to those of ordinary skill in the art that in alternative embodiments, the RSK can be encrypted with a recipient's public key without first being encrypted with the sender-public key, such as, for example, when recipient information is received by secure server 110 prior to, or in conjunction with, receipt of the communication data file, and/or when the sender does not require future access to the communication data file. Furthermore, in accordance with some embodiments, two or more copies of the communication data file can be encrypted, one copy with the sender-public key and one copy with the recipient-public key. As such, the sender could retain access to a copy of the communication data file for future use if so desired.

Continuing with FIG. 2B, at step 218, server processor 125 executes instructions such as code from server memory 135 that communicates with secure processor 125 represented by communication module 141 to generate a request for at least one communication parameter, and/or recipient information of one or more recipients, to be provided to secure server 110. A communication parameter as understood herein can be any one of a number of sender-defined parameters relating to a recipient's access to a controlled communication. For example, a communication parameter can include one or more of a designated period of time during which or until which the controlled communication will be available to the recipient, a number of times the controlled communication can be accessed, whether the controlled communication can be shared with a third party, with whom the controlled communication can be shared, etc. Recipient information as understood herein can be any one of a number of electronic contact details which can facilitate delivery of the controlled communication to the recipient device 120. For example, recipient information can include one or more of an e-mail address of the recipient, a cellular phone number, a social network user identifier (e.g., a Twitter "handle," or Facebook user ID, etc.), and/or an IP address associated with a particular recipient device or web domain. Of course, in alternative embodiments the at least one communication parameter and/or the recipient information of the one or more recipients can be received by server processor 125 without a request first being generated. Furthermore, in embodiments in which access to the sender's contact list (e.g., via integration with an e-mail client or social network application) has already been provided to secure server 110, receiving recipient information can include the sender simply selecting a specific recipient or group of recipients from the imported/integrated contact list.

Additionally, in accordance with various embodiments of the invention, server processor 125 can execute computer memory code represented by communication module 141 to enable various communication parameters particularly relating to the electronic sharing (e.g., forwarding) of controlled communications with one or more third-party recipients. As explained in detail below, secure server 110 generates a unique link which can be provided to the computing device of the recipient. The link can be used to access a secure viewer to which the electronic communication can be transmitted and on which it can be viewed. In some embodiments, third-party communication parameters can prevent any and all forwarding of a controlled communication to a third party, as the link will only provide access to the intended recipient. In these embodiments, no opportunity is provided for the recipient to provide the controlled communication to others.

In some embodiments, third-party communication parameters can allow the forwarding of the link to some recipients while disabling the link when forwarded to others. In particular, server processor 125 can execute computer memory code represented by communication module 141 to enable the sender to provide a list of "approved" third-party recipients, each of whose contact information will be associated with the controlled communication. Approved third-party recipients can include, for example, contact information of specific recipients and/or groups of recipients (e.g., e-mail addresses associated with a particular company, organization, or group). Should the recipient decide to share the controlled communication with a third-party recipient whose contact information has been provided by the sender, that third-party recipient can be treated by secure server 110 as if it were the original recipient, and the same rules and settings would generally apply. Otherwise, access to the controlled communication can be denied when the third-party recipient attempts to access it via the link.

It should be noted that in embodiments in which the original link is forwarded to an approved third party recipient, upon receipt of the third-party recipient's attempted authentication, server processor 125 can execute computer memory code represented link/viewer module 146 to generate a new unique link to be provided to the third-party recipient (as will be described in detail below with reference to step 240). Similarly, in other embodiments, when a recipient desires to share a controlled communication with a third-party recipient, secure server 110 can be configured to provide the recipient's device with a mechanism (e.g., a dialog box or other selectable input) for requesting that the secure server 110 generate and provide a new unique link directly to the approved third-party recipient. Of course, in any of the herein described embodiments, should a recipient attempt to forward/share a controlled communication with an unauthorized third-party, server processor 125 can execute computer memory code represented by communication module 141 and notification module 145 to notify the sender and request permission for access to be provided to the previously unauthorized third-party recipient. If the sender agrees, then access can be provided for the third-party recipient as described herein for the original recipient.

In some embodiments, third-party communication parameters can initially allow the forwarding of the link to any third-party recipient (i.e., the controlled communication can be shared with any third-party). In particular, server processor 125 can execute computer memory code represented by communication module 141 to activate the link to the viewer as described below for any third-party recipient who provides login/contact information, without the sender being required to first provide the contact information of that recipient. As explained herein, a new link can be generated for each new third-party recipient. Alternatively, in some embodiments the original link can be re-authorized for another user.

It should be noted that in all of the above described embodiments, the sharing of controlled communications with third-party recipients is facilitated by the server providing the controlled communication directly to the third-party recipient, regardless of from whom the link to the viewer was sent. As such, access to a controlled communication by any recipient can, at any time, be revoked. Additionally, as the secure server 110 is providing the controlled communication to each recipient device, the server processor 125 can be configured to execute computer memory code represented by communication module 141 to monitor connections between secure server 110 and each recipient device 120. In some embodiments, the sender can be provided access to a dashboard-style data and communication management application (e.g., a downloadable client-side system tray application or a web-accessible program accessible via an application program interface (API)) on which the communication data and connections can be viewed and managed directly by the sender. For example, if the sender initially allowed the recipient unrestrained permission to share the controlled communication with any third-party, the sender can still rescind the permission by electing to terminate the connection via the dashboard application. Likewise, if permission was originally granted for a controlled communication to be shared with a particular third-party recipient or group of recipients, access can later by terminated as described above, should the sender so desire. In either case, the secure server 110 will simply discontinue transmission to the recipient device of that third-party recipient.

At steps 220-224 respectively, in accordance with one or more embodiments of the invention, server processor 125 can execute computer memory code represented by communication module 141 to determine whether at least one communication parameter has been received from sender device 115, whether secure server 110 has been previously provided with any sender-defined default parameters, and/or whether any system-defined default parameters are available. If at least one communication parameter has been identified via any of steps 220-224, then at step 226 the at least one communication parameter can be implemented with regard to the controlled communication. If no communication parameters have been identified via any of steps 220-224, then at step 228, server processor 125 is configured to execute computer memory code represented by deletion/shredding module 148 to determine whether to hold the communication data file in server memory 135 at step 230 or to delete it from server memory 135 at step 232.

In various embodiments, server processor 125 can be configured to hold the communication data file in server memory 135 for a predefined period of time, after which the communication data file will be deleted by execution of deletion/shredding module 148. If the communication data file is deleted, then at step 234, in accordance with one or more embodiments of the invention, server processor 125 can execute computer memory code represented by notification module 145 to generate and/or send an alert to the sender device 115, for example, indicating that the communication data file has expired and/or has been deleted, and the method ends. It should be noted that in accordance with various embodiments, when a communication data file expires and is to be deleted from server memory 135, server processor 125 can be further configured to delete from secure database 150 all appropriate keys which have been associated with the communication data file, such as the sender-public key and the encrypted RSK, as well as set pointers to any keys to null. Thereafter, the sender-public key can be re-generated (using the deterministic sender-defined password) or re-provided from sender device 115 for future uploads, while a new RSK will have to be generated in the manner described above.

It should be noted that in accordance with various embodiments of the invention, when data is deleted from any of the various memory storage locations, further steps can be taken to ensure such data cannot be retrieved at a later point. For example, the secure server 110 can be configured by code executing in server processor 125 represented by deletion/shredding module 148 to cause any deleted file to be automatically "written-over" at least once, and possibly multiple times depending on the level of security desired. Additionally or alternatively, a process known as electronic shredding can be applied to deleted files one or more times, and/or to files set for deletion as a preliminary step prior to deletion. Electronic shredding typically includes such steps as overwriting the file's data clusters, renaming the file with a randomly generated name (thus destroying the file's original name in its directory entry), truncating the file to 0 bytes in length (which discards the file's size and starting cluster number), and deleting the renamed and truncated file. Of course, similar code can be executed on recipient device 120 as well, to cause these procedures to be applied to deleted files on the device-side, in addition to and/or in place of the server-side. As an added precaution, when a control protocol is violated, any "clipboard" application running on recipient device 120 can be instructed to automatically delete its current cache of stored data, regardless of whether any data from the controlled communication is known to have been captured.

At step 236, in accordance with one or more embodiments of the invention, server processor 125 can execute computer memory code represented by communication module 141 to determine whether recipient information of one or more recipients has been received. As with the at least one communication parameter, if recipient information of at least one recipient has been identified at step 236, then at step 238 the recipient information can be set for transmission to recipient device 120, for example, by associating the recipient information with the communication data file. If no recipient information has been identified at step 236, then, at step 228, server processor 125 is configured to execute computer memory code to determine whether to hold the communication data file in server memory 135 at step 230 or to delete it at step 232. And as described above, in various embodiments, server processor 125 can be configured to hold the communication data file in server memory 135 for a predefined period of time, after which the communication data file will be deleted and at step 234 a notification can be generated, and the method ends.

It will of course be obvious to those of ordinary skill in the art that in alternative embodiments, steps 236-238 (relating to recipient information) can be performed prior to steps 220-226 (relating to communication parameters), or they can be performed temporally, depending, for example, on when the at least one communication parameter and the recipient information are received at secure server 110.

Once the recipient information is received by secure server 110, at step 240, server processor 125 can execute computer memory code represented by link/viewer module 146, to generate a unique URL (link) for accessing a viewer which can be provided to recipient device 120. As described below, the viewer is configured to receive one or more packets of the communication data, and display the one or more packets of the communication data within the viewer. One of many functions that can be implemented on both stationary and mobile computing devices is the execution of a browser software application. Browsers enable retrieval, presentation and navigation of information resources on the World Wide Web or on web servers in private networks, and of files in file systems. Accordingly, the secure viewer can be accessed over network 105 via a browser application implemented on recipient device 120 once the recipient selects the link, launches the browser, and is properly authenticated as described below. The one or more packets of the communication data can be provided via a secure connection, such as, for example, an SSL tunnel, to the viewer. Of course, in some embodiments a proprietary desktop or mobile application having an integrated secure viewer can also be employed. Furthermore, in embodiments in which the communication data is encrypted with an additional (first) layer of encryption by execution of an encryption application on client device 115 prior to uploading the communication data to secure server 110, a corresponding proprietary desktop or mobile application can likewise be executed on recipient device 120 to decrypt the initial encryption later.

In accordance with further embodiments of the invention, when a link is generated for a recipient, server processor 125 can execute computer memory code represented by authentication module 143 to generate a serial number which is associated with the recipient. This serial number can then be stored and used by secure server 110 to represent a first node in what is referred to as a share-chain. A share-chain identifies each and every recipient/third-party recipient with whom the controlled communication has been shared, and in what order the communication has been shared. In a share-chain, a new serial number can be generated as each new unique link is created, and can be associated with the recipient of that new unique link. For example, a first recipient can be assigned a zero ("0"), and a first third-party recipient with whom the recipient has shared the controlled communication can be assigned a one ("1"), and so on.

In further embodiments, the share-chain data can then be provided by the secure server 110 to the dashboard management application on a user interface of the sender's device in the form of a visual graph or list, for example, giving the sender the ability to manage with whom a controlled communication has been shared as described above. For example, using a selectable visualization of the nodes of a share-chain on a sender's dashboard, the sender can simply select or de-select nodes to control (e.g., turn on/off) access to a controlled communication. Of course it will be obvious to those of ordinary skill in the art that the ability to control/change other settings for each node (recipient) via the dashboard management application, such as the ability to delete recipients, change expiration dates/times, etc., can also be provided to the sender.

At step 242, server processor 125 can execute computer memory code represented by communication module 141 to embed the link in a digital message or other digital communication to be provided to recipient device 120, and at step 244 the digital communication with the embedded link can be delivered to the recipient. It will be understood by those of ordinary skill in the art that many avenues exist for delivering a link from secure server 110 (via communication interface 130) to recipient device 120, either directly or indirectly. For example, the link can simply be provided to the sender at sender device 115, at which point the sender can optionally embed the link in any of a variety of possible digital communications formats, such as an e-mail, text message, tweet, web post, etc., and be subsequently retrieved by the recipient using recipient device 120. Likewise, the URL can be delivered directly to the recipient by secure server 110, using the recipient information as the destination, via any of the digital communication formats discussed above. As explained further below, selecting the link can cause the viewer to be accessed (e.g., via a browser), or can trigger one or more authentication procedures to be executed by server processor 125 prior to access being provided to the viewer and/or prior to the communication data being provided to the viewer.

Continuing with FIG. 2C, at step 246, server processor 125 can execute computer memory code represented by communication module 141 to enable access to the communication data via the secure viewer based on the at least one communication parameter, and subject to proper authentication of the recipient's log-in information. In particular, server processor 125 is configured to execute code which configures secure server 110 to implement the communication parameters defined by the sender. For example, if one communication parameter is defined as a particular calendar date after which the communication data will no longer be available to the recipient, server processor 125 is configured to set a calendar alert for secure server 110 which will terminate access once the date is reached and a transmission at that point would not comply with the communication parameter. Of course other internal alerts and/or rules can be set depending on the at least one communication parameter to ensure that a transmission of the communication data would comply with the communication parameter, such as rules which limit the amount of times the communication data can be accessed, rules which limit the total amount of time the communication data can be viewed, rules which limit with whom the link may be shared, etc.

At step 248, server processor 125 can execute computer memory code represented by link/viewer module 146 to monitor the URL for any attempted access to the viewer. In conventional manner, once the URL has been generated, any computing device on which it is selected will typically launch a browsing application and attempt to access the viewer, and more particularly, the communication data to be displayed on the viewer. Secure server 110 can therefore be configured to monitor for these attempts.

At step 250, provided the URL has not yet been selected, the secure server 110 can be configured by computer memory code executing in server processor 125 to constantly or periodically confirm, at step 252, that a limit of the at least one communication parameter has not been reached, and therefore transmission at this time would still be in compliance with the communication parameter. If no limit of the at least one communication parameter has been reached, access to the viewer would still be enabled at step 246. If a limit has been reached (e.g., an ending time for viewing the communication data has been reached), then the communication data file will be deemed to have expired and at step 254 access to the communication data via the viewer is disabled. At that point, should the link be opened in a browser application, no data would be viewable. As described in detail at step 232 above, once the communication data file expires, at step 256 it can be deleted from server memory 135, along with its various associated keys, which must be deleted from secure database 150, and the method ends. It should be noted that once access to a communication data no longer complies with a communication parameter, assess is disabled regardless of whether the URL was ever selected and/or whether the communication data was ever transmitted to recipient device 120.

Continuing at step 250, when secure server 110 determines that the URL has been selected and/or the viewer has been accessed, then at step 258, secure server 110, using server processor 125 which is configured by executing one or more software modules 140, including, preferably, communication module 141 and authentication module 143, receives and authenticates recipient log-in information from recipient device 120. This can be accomplished in conventional manner, when the URL is displayed on user interface 160 and selected by the recipient using one or more input devices 170. In accordance with various embodiments of the invention, an initial "pop-up" window or browser page can display a log-in screen having one or more text input boxes in which the recipient can enter the recipient's log-in information (e.g., username and/or password or passphrase) or other verification credentials prior to the secure viewer being displayed on the user interface 160. The log-in information is provided over network 105 to secure server 110 for verification as described below. Furthermore, in some embodiments, when the recipient selecting the link to access the viewer is a third-party recipient, that third party recipient can be presented with a log-in window or otherwise be requested to provide contact information like the original recipient. Once the information is received, secure server 110 can be configured to either simply provide access to the viewer from the original link, or generate a new link to be provided to the third-party recipient.

Depending on the various inputs operatively connected to recipient device 120, verification credentials can also include a fingerprint scan, retina scan, voice recognition, etc., or any other biometric verification. In some embodiments, the secure viewer can be displayed once the link is selected, and an initial log-in request can be displayed within the viewer prior to the controlled communication being displayed. In some embodiments, the authentication process can require the recipient to be identified using social authentication, a one-step or two-step email authentication, or the like. Only once the recipient has been authenticated can transmission between secure server 110 and recipient device 120 begin.

In alternative embodiments, when the recipient information includes an e-mail address or other verified user account which can receive a digital communication, clicking on the provided link does not immediately launch the browser containing the embedded viewer. Instead, it causes secure server 110, using server processor 125 which is configured by executing one or more software modules 140, including, preferably, communication module 141 and authentication module 143, to generate and deliver a second link to the email address or verified user account of the recipient. Only selecting this second link from within this second digital communication will finally cause the browser to launch with the viewer. As can be readily understood, requiring the recipient to select the second link from within the digital communication provided to an e-mail address or other verified user account, provides additional assurance that only the intended recipient can view the communication data. Further, the second link can be provided with a set lifespan (e.g., two minutes from the moment the first link is selected), after which the opportunity for the recipient to be authenticated via the second link will expire, thus heightening the likelihood that the recipient of the first link is also the recipient of the second link.

In accordance with further embodiments, the link itself can be specifically tailored to the recipient's e-mail address, verified user account, or other recipient information, such as the IP address of recipient device 120. As such, the link can be configured to launch the browser and secure viewer only when selected from the e-mail address, verified user account, or other recipient information to which it was tailored. This would act as yet another form of verification, and prevent the link from functioning properly when accessed via an unauthorized e-mail address, verified user account, IP address, etc.

At step 260, server processor 125 can execute computer memory code represented by authentication module 143 to verify the log-in information provided by recipient device 120. This can include, for instance, verifying that the log-in information provided by recipient device 120 matches the recipient information provided by sender device 115. If the log-in information of the recipient cannot be verified then at step 262 access is disabled as described above, and at step 264 a notification can be generated and provided to sender device 115 and/or recipient device 120 indicating, for example, that recipient verification has failed. As described in detail at step 232 above, at step 266 the communication data file can then be deleted from server memory 135, along with its various associated keys which must be deleted from secure database 150, and the method ends. It should be noted that in alternative embodiments a failed log-in may not immediately trigger deletion of the communication data file. Instead, a predefined number of attempted log-in verifications can be set before triggering one or more of steps 262-266 as described above.

In accordance with further embodiments of the invention, verification step 260 can also include verifying that an SSL tunnel can be created between secure server 110 and recipient device 120. As described above in relation to step 208, the process of creating an SSL tunnel is called an "SSL Handshake." Once the log-in information provided by recipient device 120 has been verified, server processor 125 can execute computer memory code represented by communication module 141 to provide recipient device 120 with a Certificate-Authority-issued SSL Certificate, which includes the secure server's public key, and which verifies the identity of secure server 110.

As further described above, in a conventional manner, recipient device 120 checks the certificate root against a list of trusted Certificate Authorities, and confirms that the CA-issued SSL Certificate is valid. Once the CA-issued SSL Certificate is validated, the device processor 155 of recipient device 120 is configured by code executing therein to create, encrypt, and send back to the secure server 120 a symmetric session key using the secure server's public key provided with the certificate. Server processor 125 can execute computer memory code represented by encryption/decryption module 144 to decrypt the symmetric session key using the secure server's private key, and then send back to the recipient device 120 an acknowledgment encrypted with the recipient-generated symmetric session key to start the encrypted session. All data passed between the two devices via the SSL tunnel are encrypted and decrypted using the symmetric session key.

To complete verification, in accordance with embodiments of the invention, once an SSL tunnel has been created between secure server 110 and recipient device 120, if the RSK has not yet been decrypted using the sender-private key and then re-encrypted using a public key of the recipient (e.g., a public key generated by the recipient device 120) as described at step 216 above, then secure server 110 is configured by code executing in server processor 125 represented by encryption/decryption module 144 to perform this sequence of steps now, thus enabling the recipient device 120 to securely access the communication data file using the RSK when transmission begins.

At step 268, once the log-in information provided by recipient device 120 has been verified, secure server 110 is configured by code executing in server processor 125 represented by control module 144 to activate at least one control protocol relating to the transmission. As described above, control protocols prevent against unauthorized viewing and/or manipulation of an electronic communication being transmitted to a recipient's device. Depending on the type of electronic device being used to access the viewer, and depending on the type(s) of input device(s) 170 operatively connected to and/or integrated with recipient device 120, secure server 110 can provide a variety of control protocols in order to prevent against unauthorized viewing, manipulation, and/or actions.

It should be noted that in accordance with various embodiments, some control protocols can function similarly regardless of the device on which they are activated, while others may be device specific depending on the features and/or limitations of the device. For example, control protocols that are integrated within the viewer will typically operate similarly on different devices on which the viewer has been opened (e.g., computer, MED, tablet, etc.), while control protocols which take advantage of various device inputs and sensors may function differently depending on which inputs and sensors are available. Mobile devices in particular tend to have a number of sensors that can be employed, but also tend to have some important limitations. It should therefore be understood that in accordance with various embodiments of the invention, different combinations of control protocols can be activated depending on the specific device. Furthermore, secure server 110 is configured by code executing in server processor 125 represented by control module 147 to communicate with processor 155 of recipient device 120 to determine which control protocols can be activated. Secure server 110 is configured to remotely monitor all activated control protocols, and can terminate a transmission at the moment a control protocol is violated.

In accordance with embodiments of the invention, one control protocol that is integrated within the viewer takes advantage of how information is typically rendered in a browser to prevent copying or saving information to a file. As explained in detail below, the communication data file is transmitted (streamed) over network 105 in packets. The packets are read by the browser client and rendered to a HTML5 Canvas (or its equivalent), which is a tool to present a collection of pixels on a web page. A canvas consists of a drawable region typically defined in HTML code with height and width attributes. JavaScript code can access the area through a full set of drawing functions, thus allowing for dynamically generated graphics representing the data to be generated on the canvas. The Canvas cannot be saved as an image directly, since it is not an image. There are programs which have the ability to "read" the pixels to an image, but this can be prevented by triggering the browser's own internal security restrictions. When an internal property of the Canvas, called the "origin-clean" flag, is set off by an action which the browser's security policy detects as one that could lead to "data leakage" (a malicious attack in which data is stolen from internal networks and local file-systems by malicious web pages), the browser will only allow the device to "write" to the browser and not "read" any pixels from that canvas programmatically. The relevant control protocol, once activated by the secure server 110 and implemented by the recipient device 120, can therefore cause an action that intentionally imitates a risk of "data leakage," and thus causes the browser to protect the canvas (and the viewer) from any attempt to copy its internal content or save the content to a file.

In accordance with further embodiments of the invention, another example control protocol can prevent recipient device 120 from performing a screen capture or print function by monitoring input device usage. When recipient device 120 comprises a keyboard, while communication data is be transmitted to the secure viewer, any attempt by a user of the recipient device 120 to press on an unauthorized key, such as, for example, any key that is not one of the arrow keys, can result in the transmission being terminated and the content disappearing from the viewer at the moment the keys are depressed. When recipient device 120 comprises a mouse or other pointing device, the coordinates of the pointing device cursor can be tracked and recorded on the browser. As such, when secure server 110 detects that the pointing device cursor has left the frame of the browser in which the viewer is being displayed or the browser is no longer in focus (e.g., if the user clicks on another browser window, the home screen, or even "right-clicks" on the mouse), the transmission can likewise be terminated and cause the content to disappear from the viewer. Furthermore, the coordinates can be monitored for any detected "jump," which is a rapid change in location, even within the browser. Certain applications can cause a coordinate jump, even when running in another window or in the background on a recipient's device. Therefore, detection of a jump can indicate that the recipient is attempting to activate/use a data capturing application. As such, the transmission can likewise be terminated and cause the content to disappear from the viewer as above.

These control protocols ensure that a recipient cannot use a key shortcut (e.g. pressing the "Ctrl" and "Print Screen" buttons simultaneously on a personal computer to capture whatever is presently being displayed on the display) or click on a screen-capture activation or print button. As will be explained below, depending on the control protocol being violated, the transmission may be temporarily terminated until secure server 110 determines that the control protocol is again being adhered to, for example, when the pointing device cursor is returned to the frame. Alternatively, the transmission can be permanently terminated, for example, depending on the severity of the violation.

In further embodiments, certain device and/or input "drivers" can be disabled, effectively disabling the inputs. A driver is a program or code set which is often required for certain input devices to properly communicate with the computing device to which they are connected. For example when a printer or web camera is connected to a computer, each of these devices typically requires a driver be installed on the computer. Therefore, in embodiments of the invention, server processor 125 can execute computer memory code represented by control module 141 to temporarily disable a driver, and thereby disable the input device associated with that driver. Of course, other similar mechanisms for disabling particular input devices can also be employed, such as disabling touch-screen functionality on a touch-screen enabled device, disabling a keyboard or pointing device entirely, intercepting input signals of input devices as they are sent to the processor of the recipient device 120, overloading the processor temporarily with "dummy" input signals, etc.

Additionally, in accordance with further embodiments of the invention, server processor 125 can execute computer memory code represented by control module 141 to enable and control certain input devices, rather than to disable them. For example, when recipient device 115 comprises an operatively connected or integrated image capture device such as a front-facing camera or a web-camera, such an image capture device can be activated while content is being transmitted to the viewer. The image capture device can be actively recording or simply in stand-by mode. Should the recipient fail to adhere to certain control protocols, an image or video can be captured and/or sent to the sender. Such an implementation can function as a deterrent for those recipients who may have inappropriate intentions, such as a recipient trying to capture a screenshot of an image which is being privately shared in a controlled communication.

Furthermore, in instances when facial recognition is used as a form of identification during log-in verification, and/or when a particular facial image is associated with a recipient, the image capture device and facial recognition software can be employed by secure server 110 to enable a control protocol which will ensure that only the recipient whose appearance matches the known facial image is able to view the viewer. This can be particularly useful in a work or public environment, where third-parties may attempt to view content on the recipient's device. Similarly, the image capture device can be employed by secure server 110 in conjunction with shape detection software to enable a control protocol which allows the image capture device to monitor for and detect a predefined shape, for example one resembling that of a camera or camera-equipped cellphone, etc., such as a rectangular shape. The detection of a rectangle, for example, can indicate an attempt by the recipient to photograph or otherwise capture the display showing the communication using an external image capture device. When such a predefined shape is detected, secure server 110 can terminate a transmission at the moment the control protocol is violated.

In yet further embodiments, other connected or integrated sensors and/or input devices can be harnessed to provide additional control protocols. For example, a light sensor can be activated to detect the flash of a camera being used by one attempting to photograph the display. Likewise, a microphone can be activated to detect the sound of a camera shutter "click" (real or fabricated for effect, e.g., by a digital camera). It will of course be obvious to those skilled in the art that many other types of sensors and/or input devices can be likewise incorporated to achieve similar goals of detecting and preventing the capture of controlled communications.

As mentioned above, mobile electronic devices (MEDs) in particular tend to have a number of sensors that can be employed, but also tend to have some important limitations. Therefore embodiments of the invention activate control protocols particularly tailored to control communications transmitted to a MED. One instance of note is with regard to preventing screen capturing when the recipient device 120 is a MED. Certain MEDs comprise mobile operating systems on which screen-capturing is a system-wide functionality which cannot be easily blocked or altered. A user can press a combination of physical buttons (e.g., HOME+LOCK) or perform specific gestures on other inputs (e.g., swiping a touch-screen in a specific manner) at any time in order to capture the current screen and save the image to the device's memory. Older mobile operating systems allowed programmers and application developers to use several methods of detection and prevention of screenshots. These methods have been disabled by newer mobile operating systems, which instead provide a new notification type which allows an application to detect when a screenshot was taken. Unfortunately, this notification is posted only after the screenshot is saved and therefore does not give the application an opportunity to change the display or take any steps to prevent the action.

Therefore in accordance with various embodiments of the invention, a number of control protocols are described herein which either entirely prevent screen capture on a MED, or make a screen capture effectively worthless. In accordance with a one control protocol, server processor 125 can execute computer memory code represented by control module 141 to enable transmission of the communication data file (e.g., an image or document) to recipient device 120 for display in the viewer on user interface 165 only while the MED is completely stationary (i.e., motionless). An internal accelerometer, gyroscope, or other input device 170 can be used to detect the position and/or any movement of recipient device 120. Should any change in position or movement be detected, for example, when the device is moved or touched, the transmission is immediately terminated and the content disappears from the secure viewer. An attempt to press a button or interact with any input device will likely cause the input device 170 to detect a movement and trigger termination of the data transmission.

In accordance with another control protocol, server processor 125 can execute computer memory code represented by control module 141 to display only distinct portions of the communication data in the viewer at any given moment. Should a screenshot be successfully captured, only the presently displayed portion of the communication data would be captured before the MED's internal notification would indicate that a screen-capture has been taken, at which point the transmission is immediately terminated, the content disappears from the secure viewer, and no further portions of the communication data would be displayed.

It should be readily understood that there are a variety of ways in which only a distinct portion of the communication data can be displayed at a given moment. The key factor is that in any of the control protocols herein described, the recipient would never have the opportunity to capture the entire corpus of the communication data with a single action, and thus the portion captured will be less useful to a person who is interested in capturing data of which he or she is not the owner. For example, in some embodiments the transmission itself will only provide certain portions of the communication data at a given moment. In other implementations, data representing the entire communication data can be transmitted, while only portions are actually displayed.

To implement the above described control protocol (on any recipient device), server processor 125 can execute computer memory code represented by control module 141 to divide the communication data file into N number of distinct display portions (where N=number of portions, e.g., two or more). Each display portion contains some of the data needed to display the full communication data file. When the communication data file comprises a document, for example, the document can be divided to include a left part and right part, or, a first part containing even lines of text and second part containing odd lines of text, etc. When the communication data file comprises an image, if all pixels of the image are numbered 1, 2, 3, 4, etc., then all odd pixels can be divided into one part and all even pixels can be divided into a second part, for example. Of course this can be extended to more than 2 parts as required. Secure server 120 can be configured to instruct processor 155 of recipient device 120 to execute a graphically accelerated procedure on user interface 165 which will quickly alternate between the different parts in such a way that will minimize any discomfort of one viewing the secure viewer. When a screenshot is successfully taken, only 1/N of the total data can be captured before transmission is terminated. In various embodiments, portions which are not being displayed can either be masked with alternate data (e.g., a "black-out" or obstacle area), or can simply not be displayed at all, thus leaving that portion of the display blank.

In accordance with various embodiments, division can be based, for example, on a horizontal or vertical split, discrete location of pixels (e.g., every Nth pixel), dark tones and bright tones of an image, alternating sentences or characters in a document, randomly chosen, etc. Furthermore, in different embodiments of the invention, alternation between the discrete portions can be effectuated automatically, for example in a time-based approach as described with reference to FIG. 3 below, or manually, for example in a space-based approach as described with reference to FIGS. 4A-D below.

Figure 3:
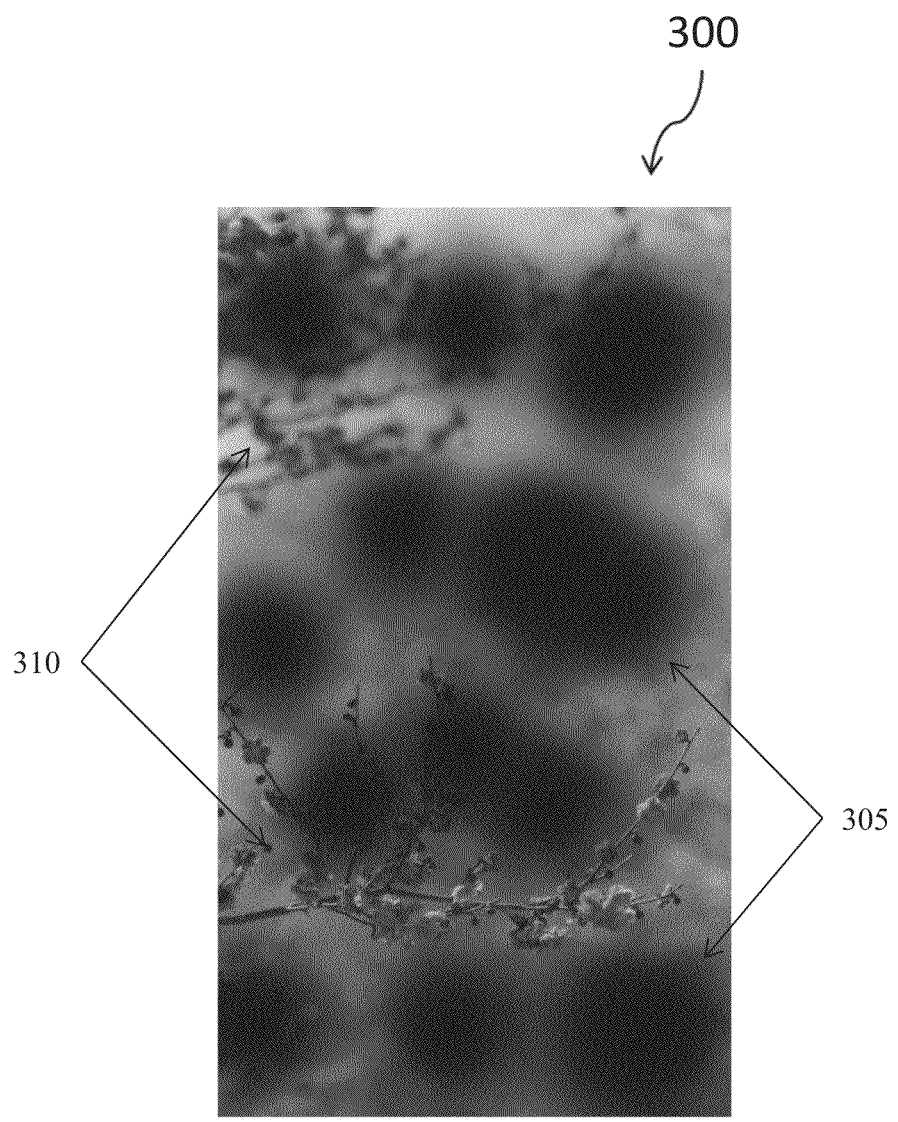
FIG. 3 is an example illustration of an image displaying in a secure viewer wherein discrete portions of the image are not displayed, according to at least one embodiment of the invention.

For example, turning briefly to FIG. 3, an example image 300 is shown, wherein the exemplary black holes 305 represent portions of data not being displayed at a given moment, and the image sections 310 represent portions of data which are being displayed at that same moment. In embodiments of the invention, server processor 125 can execute computer memory code represented by control module 141 to instruct processor 155 of recipient device 120 to execute further code which causes various portions of the complete set of data to be alternately displayed and hidden at a rapid pace. A recipient viewing the content on the viewer would perceive the full image. However, if a screenshot were to be taken, only a much smaller portion of the image or document would be captured. This control protocol would not require user interaction with recipient device 120 on the part of the recipient, as the different parts or locations of obstacles are switched automatically and at a high frequency over time.

Figure 4A:
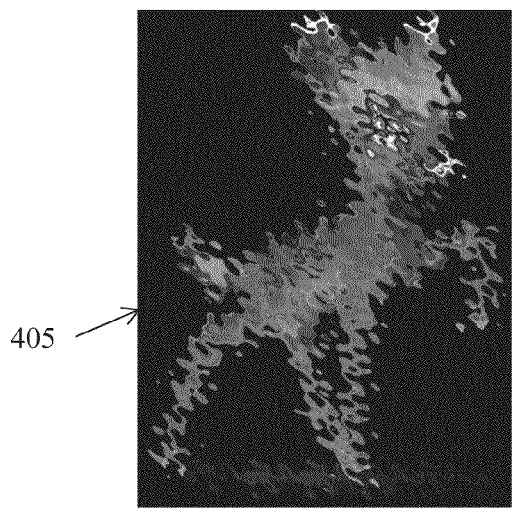
FIGS. 4A-B are illustrations of example masks positioned to conceal or obscure an image displaying in a secure viewer according to at least one embodiment of the invention.
Figure 4B:
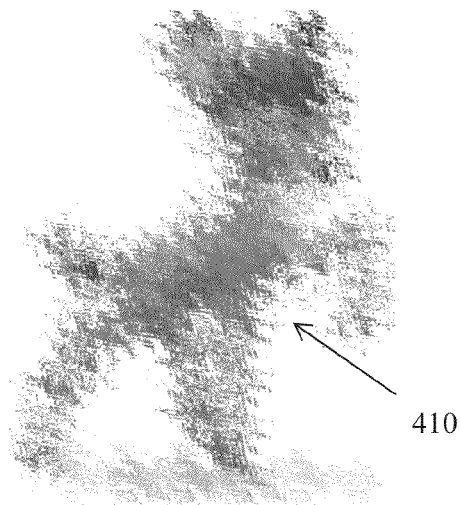

Turning not briefly to FIGS. 4A-B, various examples of masks of an image 400 representing a communication data file displaying in a secure viewer on an MED are shown. Specifically, FIG. 4A depicts a complete mask 405, wherein none of the actual content of the communication data file is initially visible. Instead, server processor 125 can execute computer memory code represented by control module 141 to instruct processor 155 of recipient device 120 to execute further code which causes the content to either be concealed (e.g., covered) or replaced with other content while displaying in the viewer on user interface 165. It should be noted that the complete mask 405 can be simultaneously used to both hide the content and to provide direction as to where the various parts of the content are located beneath the complete mask 405. In some embodiments, for added security the compete mask 405 can be entirely black or otherwise non-descript with reference to content hidden below. FIG. 4B depicts a partial mask 410, wherein content of the communication data file is blurred, jumbled, or otherwise sufficiently obscured such that a screen capture would be fruitless. As with complete mask 405, partial mask 410 can be simultaneously used to both hide the content and to provide direction as to where the various parts of the content are located beneath the partial mask 410.

Figure 4C:
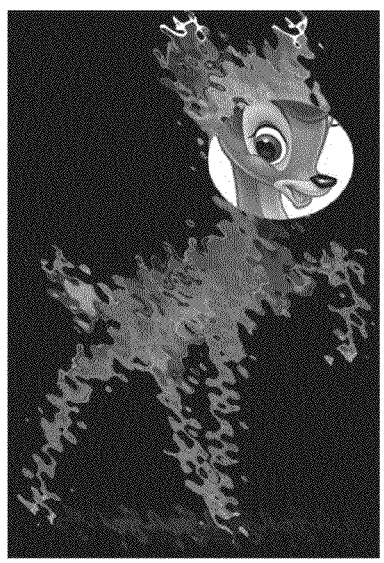
FIGS. 4C-D are illustrations of various examples of partially revealed portions of the image concealed by the mask of FIG. 4C according to at least one embodiment of the invention.
Figure 4D:
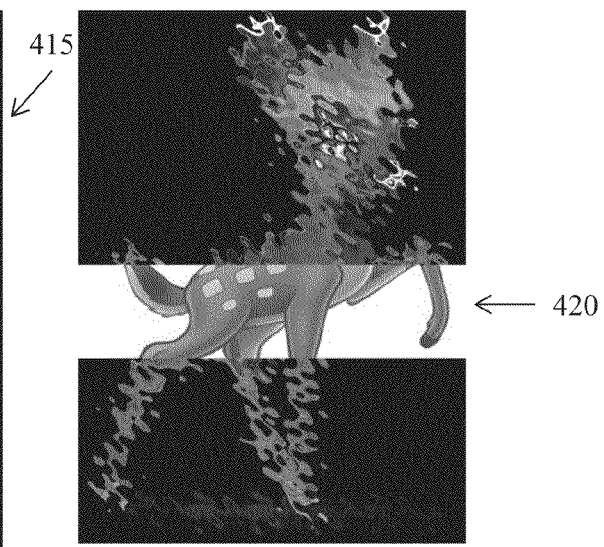

Turning now briefly to FIGS. 4C-D, various examples of image 400 with partially revealed portions, are shown. Specifically, FIG. 4C depicts one example of image 400 in which server processor 125 can execute computer memory code represented by control module 141 to instruct processor 155 of recipient device 120 to execute further code which provides a "flashlight" mode, wherein a portion of the communication data file (in this case, image 400) can be displayed by the recipient manually choosing which portion to reveal. As the recipient traces over a particular portion of the viewer with a finger, stylus, or other pointing device, processor 155 causes that portion to be exposed within a certain radius 415 around the pointing device. Various parameters can be predefined, such as, for example, the radius size, detection of dithering at the edges, a certain amount of delay before the exposed image portion disappears, etc. Of course, other shapes, distances, and sizes of the flashlight mode beside for a circle can be implemented as well.

Similarly, FIG. 4D depicts another example of image 400 in which server processor 125 can execute computer memory code represented by control module 141 to instruct processor 155 of recipient device 120 to execute further code which provides an "elevator" mode, wherein a portion of the communication data file (in this case, image 400) can be displayed by the recipient manually tilting, shaking or otherwise moving the recipient device 120. As the device is tilted, a reading from an internal sensor such as an accelerometer is translated by device processor 155 into a location of a portion of the viewer, in this case a horizontal bar 420. Only the portion of the content delineated by the horizontal bar 420 is displayed. It might be possible for the recipient to quickly tilt the screen while following with his/her eyes, to take a glimpse of the entire image, but a screen capture would again be fruitless, as only the exposed portion would be captured before transmission would cease. Of course other shapes, sensors, and/or motions can be similarly incorporated. Alternatively, a hybrid control protocol can allow for a finger or other pointer to be traced over the edges of a screen on which the viewer is displayed to reveal portions of the viewer that are proximate to or otherwise level with the location of the trace.

It should be noted that while the control protocols described with reference to FIG. 3 and FIGS. 4A-D are particularly suited for application on a MED, these and similar control protocols can also be employed on stationary computing devices as well.

Returning to FIG. 2C, in some embodiments, system 100 can be configured to implement control protocols which require the recipient to perform certain predefined actions in order for a controlled communication to be displayed. For example, in accordance with further embodiments of the invention, server processor 125 can execute computer memory code represented by control module 141 to initially provide a blurred, distorted, or otherwise masked version of the controlled communication to the viewer. The recipient can then be required to perform the predefined action—for example, holding down the spacebar key—in order for a viewable version of the controlled communication to be provided. Such a required action can be constant (i.e., continuously holding the space-bar), or intermittent (i.e., for a certain period of time and/or at discrete intervals). The moment the recipient ceases to perform the predefined action (e.g., releasing the spacebar key in the constant-action embodiment), or does not perform the required action at the required time/interval, the blurred version of the controlled communication is again presented.

In some embodiments, to facilitate the above described control protocols any of a number of file types provided by the sender to secure server 110 (e.g., .doc, .ppt, .pdf, etc.) can be converted to an image file type (e.g., .png or .jpg) by server processor 125 executing computer memory code represented by file processing module 149, which enables secure server 110 to process and support the various file types for the viewer. Thereafter a blurred version of the image can be created as well when required. The image pair can then be saved and used in the presentation of the controlled communication to the recipient device. This can be particularly convenient when a specific control protocol could be better achieved (i.e., greater level of control) with an image file as opposed to another file type.

Referring again to step 268 of FIG. 2C, in accordance with further embodiments of the invention, server processor 125 is configured to execution computer memory code represented by control module 147 to provide yet another control protocol in which secure server 110 can monitor the connection between the server and recipient device 120. When the communication interface 175 of recipient device 120 loses the connection with communication interface 130 of secure server 110, all received data is automatically cleared from the viewer and access to communication data ceases. The same will occur in instances when all the communication data has already been streamed, but the server is no longer reachable. Secure server 110 is therefore configured to perform constant checks to see if a connection exists.

It should be noted that while the embodiments disclosed herein have generally described systems and/or methods in which many of the operations are described as being executed and/or performed on secure server 110, further embodiments also contemplate one or more of the many server operations being executed and/or performed on client device 115 and/or recipient device 120. Furthermore, in various embodiments of the invention, a proprietary client application can be installed on sender device 115 and/or recipient device 120, which can further facilitate execution and performance of the invention. A proprietary client application installed on recipient device 120, for example, can include one or more software modules 180 having computer program code or a set of instructions executed in the device processor 155 for carrying out operations for aspects of the systems and methods disclosed herein, and can be written in any combination of one or more programming languages. One or more of the software module 180 can replicate one or more server modules 140 and can be executed by processor 155 to enable one or more operations to be performed on recipient device 120 in addition to or in place of secure server 110.

By way of example, such a proprietary client application could be configured to monitor the connection between secure server 110 and recipient device 120 from the client (recipient) side, and can actively clear all received data from the viewer and/or force the viewer to close when the communication interface 175 of recipient device 120 loses the connection with communication interface 130 of secure server 110. As a further example, the proprietary client application can comprise a secure viewer integrated directly in a stand-alone application, rather than interacting with a separate browser application. Of course, other operations can also be performed by the proprietary client application provided they do not jeopardize any secure feature of the system.

Continuing now at step 270, upon determining that the viewer has been accessed, and the recipient device 120 has been verified, server processor 125 is configured to execute computer memory code represented by communication module 141 to cause secure server 110 to create and begin transmitting one or more packets of the communication data file to the viewer for display within the viewer. As explained above, the transmission can continue until completion, provided it complies with the at least one communication parameter and while the at least one control protocol is adhered to. In accordance with various embodiments, the packets are preferably created in a proprietary format, though standard formats may also be used. The packets are streamed from secure server 110 to recipient device 120 by means of a persistent (real-time) connection within the SSL tunnel. For example, in some embodiments one or more of a variety of common protocols can be used, such as Websocket, XHR, and RTMPS/T, depending on the file type (text, binary, video, etc.), the scenario, and the client (recipient device 120).

A key advance of using a protocol such as Websocket is that communication between secure server 110 and recipient device 120 takes place in real time and is bi-directional over a full-duplex single socket connection (rather than requiring multiple HTTP connections). Each packet created from the previously encrypted communication data file is streamed over the SSL tunnel to the recipient device 120 and decrypted using the RSK, at which point the packets are read by the viewer to interpret the proprietary format and display the communication data file within the viewer.

At step 272, while the packets are streamed to the secure viewer, server processor 125 is configured to execute computer memory code represented by communication module 141 to monitor the various communication parameters and confirm that the transmission complies with each. If at any point the transmission no longer complies with a communication parameter, then at step 274 transmission of the packets to the viewer is permanently discontinued. Likewise, at step 276, server processor 125 is configured to execute computer memory code represented by control module 147 to monitor the various control protocols during transmission of the packets, and confirm that the transmission complies with each control protocol.

If at any point a control protocol is not adhered to (i.e., a control protocol is violated), then at step 278 transmission is temporarily stopped and server processor 125 is configured to determine whether the control protocol is correctable. For example, if the recipient unintentionally engages a single unauthorized but non-threatening key on a keyboard of recipient device 120, transmission will temporarily cease as discussed in detail above. Such a violation may be deemed by the system to be correctable, provided the recipient releases the key, for example within a predefined period of time. If the violation is correctable, then at step 280 the secure server 110 is configured to determine whether the violation has been sufficiently corrected for transmission to continue at step 270. If the violation is correctable but is not corrected in time, then at step 274 transmission of the packets to the viewer is permanently discontinued.

If the control protocol is not correctable (e.g., if the system detects that a screen capture or print command was attempted), then, at step 282, server processor 125 can be configured to execute computer memory code represented by notification module 145 to generate and/or send a notification alerting the sender and/or the recipient than a non-correctable control protocol has been violated. Then, at step 274 transmission of the packets to the viewer is permanently discontinued. As discussed in relation to step 256, once transmission is permanently discontinued, either due to a communication parameter limit being reach or due to an uncorrectable control protocol being violated, the communication data file can be deleted from server memory 135, along with its various associated keys which must be deleted from secure database 150, and the method ends.

At this juncture, it should be noted that although much of the foregoing description has been directed to systems and methods for providing controlled communications, the systems and methods disclosed herein can be similarly deployed and/or implemented in scenarios, situations, and settings far beyond the referenced scenarios. It is to be understood that like numerals in the drawings represent like elements through the several figures, and that not all components and/or steps described and illustrated with reference to the figures are required for all embodiments or arrangements.

Thus, illustrative embodiments and arrangements of the present systems and methods provide a computer implemented method, computer system, and computer program product for providing controlled communications. The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The functions describe herein can be implemented by hardware and or hardware executing code (also known as programs, software, or software applications) which include machine instructions for a programmable processor, and can be implemented in a high-level procedural and/or object-oriented programming language, and/or in assembly/machine language. As used herein, the terms machine-readable storage medium and computer-readable storage medium refer to any computer program product, apparatus and/or device (e.g., magnetic discs, optical disks, memory, Programmable Logic Devices (PLDs)) used to provide machine instructions and/or data to a programmable processor, including a machine-readable storage medium that receives machine instructions as a machine-readable signal. The term machine-readable signal refers to any signal used to provide machine instructions and/or data to a programmable processor. A machine-readable storage medium does not include a machine-readable signal.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a," "an" and "the" are intended to include the plural forms as well, unless the context clearly indicates otherwise. Likewise, "a," "an," and "the" are intended to include "one or more" and/or "at least one," unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method of providing controlled communications, performed by a server, the server being connected to a network and having a memory, a processor, and one or more code sets stored in the memory and executable in the processor, the method comprising:
   receiving, at the processor, communication data;
   receiving, at the processor, at least one communication parameter and recipient information related to a transmission of the communication data to a recipient over the network;
   generating, using code executing in the processor, a link for accessing a viewer on a recipient device, the viewer being configured to receive one or more packets of the communication data transmitted to the recipient device over the network, and display the one or more packets of the communication data within the viewer;
   activating, using code executing in the processor, at least one control protocol relating to the transmission;
   determining, using code executing in the processor, whether the viewer has been accessed by the recipient via the link;
   upon determining that the viewer has been accessed by the recipient, causing the transmission, using code executing in the processor, of the one or more packets of the communication data over the network to the viewer for display within the viewer while the transmission complies with the at least one communication parameter and while the at least one control protocol is adhered to; and
   deleting, using code executing in the processor, the received communication data when the at least one control protocol has been violated and the violation cannot be corrected.

2. The method as in claim 1, further comprising:
   embedding the link in a digital communication; and
   providing the digital communication to the recipient over the network.

3. The method as in claim 1, further comprising:
   requesting a verification of the recipient; and
   transmitting the one or more packets of the communication data to the viewer only upon receiving the verification.

4. The method as in claim 1, wherein activating the at least one control protocol further comprises:
   monitoring at least one input device of the computing device for one or more predefined violating inputs deemed to violate the at least one control protocol; and
   automatically discontinuing the transmission of the one or more packets of the communication data to the viewer upon detecting the one or more predefined violating inputs.

5. The method as in claim 4 wherein the one or more predefined violating inputs comprises at least one of:
   a selection of, or pointing to, any area of the display other than within the viewer; and
   a pressing of at least one button or key of the input device that is deemed to violate the at least one control protocol.

6. The method as in claim 1, wherein activating the at least one control protocol further comprises:
   activating a write-only function of the viewer; and
   automatically discontinuing the transmission of the one or more packets of the communication data to the viewer upon detecting an attempted read function of the viewer.

7. The method as in claim 1, wherein activating the at least one control protocol further comprises:
   monitoring the transmission to ensure that the one or more packets of the communication data is received by the viewer; and
   automatically discontinuing the transmission of the one or more packets of the communication data to the viewer upon detecting that the one or more packets of the communication data was not received during the transmission.

8. The method as in claim 1, wherein the at least one communication parameter comprises at least one of:
   a period of time during which the communication data can be displayed in the viewer;
   a number of times the viewer can be accessed; and
   an indication relating to with whom the communication data can be shared electronically.

9. The method as in claim 1, further comprising deleting the received communication data when the transmission no longer complies with the at least one communication parameter.

10. The method as in claim 1, wherein causing the transmission of the one or more packets of the communication data over the network to the viewer further comprises:
    establishing a secure tunnel between the server and the recipient device; and
    causing the transmission of the one or more packets of the communication data over the network to the viewer through the secure tunnel.

11. A system in support of providing controlled communications, comprising:
    a server having a processor and memory, and being connected to a network;
    a plurality of code sets that are executable in the processor and which, when executed, configure the processor to:
        receive communication data;
        receive at least one communication parameter and recipient information related to a transmission of the communication data to a recipient over the network;
        generate a link for accessing a viewer on a recipient device, the viewer being configured to receive one or more packets of the communication data transmitted to the recipient device over the network, and display the one or more packets of the communication data within the viewer;
        activate at least one control protocol relating to the transmission;
        determine whether the viewer has been accessed by the recipient via the link;
        upon determining that the viewer has been accessed by the recipient, cause the transmission of the one or more packets of the communication data over the network to the viewer for display within the viewer while the transmission complies with the at least one communication parameter and while the at least one control protocol is adhered to; and
        delete the received communication data when the at least one control protocol has been violated and the violation cannot be corrected.

12. The system as in claim 11, further configured to:
embed the link in a digital communication; and
provide the digital communication to the recipient over the network.

13. The system as in claim 11, further configured to:
request a verification of the recipient; and
transmit the one or more packets of the communication data to the viewer only upon receiving the verification.

14. The system as in claim 11, further configured to:
monitor at least one input device of the computing device for one or more predefined violating inputs deemed to violate the at least one control protocol; and
automatically discontinue the transmission of the one or more packets of the communication data to the viewer upon detecting the one or more predefined violating inputs.

15. The system as in claim 14 wherein the one or more predefined violating inputs comprises at least one of:
a selection of, or pointing to, any area of the display other than within the viewer; and
a pressing of at least one button or key of the input device that is deemed to violate the at least one control protocol.

16. The system as in claim 11, further configured to:
activate a write-only function of the viewer; and
automatically discontinue the transmission of the one or more packets of the communication data to the viewer upon detecting an attempted read function of the viewer.

17. The system as in claim 11, further configured to:
monitor the transmission to ensure that the one or more packets of the communication data is received by the viewer; and
automatically discontinue the transmission of the one or more packets of the communication data to the viewer upon detecting that the one or more packets of the communication data was not received during the transmission.

18. The system as in claim 11, wherein the at least one communication parameter comprises at least one of:
a period of time during which the communication data can be displayed in the viewer;
a number of times the viewer can be accessed; and
an indication relating to with whom the communication data can be shared electronically.

19. The system as in claim 11, further configured to delete the received communication data when the transmission no longer complies with the at least one communication parameter.

20. The system as in claim 11, further configured to:
establish a secure tunnel between the server and the recipient device; and
cause the transmission of the one or more packets of the communication data over the network to the viewer through the secure tunnel.

* * * * *